(12) United States Patent
Dowe et al.

(10) Patent No.: US 10,072,786 B2
(45) Date of Patent: Sep. 11, 2018

(54) USE OF A CONDUIT PIPE FOR PRODUCING A DUCT LAID IN WATER

(75) Inventors: Andreas Dowe, Borken (DE); Rainer Goering, Borken (DE); Hans-Juergen Kocks, Freudenberg (DE); Joern Winkels, Werl (DE)

(73) Assignees: Evonik Degussa GmbH, Essen (DE); Salzgitter Mannesmann Line Pipe GmbH, Siegen (DE)

( * ) Notice: Subject to any disclaimer, the term of this patent is extended or adjusted under 35 U.S.C. 154(b) by 313 days.

(21) Appl. No.: 13/202,338

(22) PCT Filed: Jan. 20, 2010

(86) PCT No.: PCT/EP2010/050622
§ 371 (c)(1),
(2), (4) Date: Sep. 23, 2011

(87) PCT Pub. No.: WO2010/094528
PCT Pub. Date: Aug. 26, 2010

(65) Prior Publication Data
US 2012/0000541 A1    Jan. 5, 2012

(30) Foreign Application Priority Data
Feb. 19, 2009  (DE) .................. 10 2009 001 001

(51) Int. Cl.
| C08C 19/24 | (2006.01) |
| F16L 58/10 | (2006.01) |
| C09D 177/00 | (2006.01) |
| F16L 57/06 | (2006.01) |

(52) U.S. Cl.
CPC .......... *F16L 58/109* (2013.01); *C09D 177/00* (2013.01); *F16L 57/06* (2013.01); *Y10T 137/0318* (2015.04)

(58) Field of Classification Search
CPC .. B29C 53/665; B29C 53/8016; B29C 70/088
USPC ............. 405/154.1, 158; 428/36.91
See application file for complete search history.

(56) References Cited

U.S. PATENT DOCUMENTS

| 3,389,563 | A | * | 6/1968 | Postlewaite et al. ......... 405/166 |
| 3,715,890 | A | * | 2/1973 | Langner ......................... 405/166 |
| 6,328,502 | B1 | * | 12/2001 | Hickey et al. ............... 405/168.3 |
| 6,677,015 | B2 | | 1/2004 | Himmelmann et al. |
| 8,017,691 | B2 | | 9/2011 | Richter et al. |
| 8,147,937 | B2 | * | 4/2012 | Brisson .................. B29C 53/665 428/34.1 |
| 2004/0028921 | A1 | | 2/2004 | Amouroux |
| 2006/0182916 | A1 | | 8/2006 | Dowe et al. |
| 2006/0183869 | A1 | | 8/2006 | Dowe et al. |
| 2007/0036998 | A1 | | 2/2007 | Dowe et al. |
| 2008/0096031 | A1 | * | 4/2008 | Amouroux .................... 428/458 |
| 2008/0119632 | A1 | | 5/2008 | Baumann et al. |
| 2010/0009106 | A1 | | 1/2010 | Dowe et al. |
| 2010/0300572 | A1 | | 12/2010 | Dowe et al. |
| 2010/0300573 | A1 | | 12/2010 | Dowe et al. |
| 2011/0165358 | A1 | | 7/2011 | Dowe et al. |
| 2011/0209768 | A1 | | 9/2011 | Dowe et al. |
| 2012/0006465 | A1 | | 1/2012 | Dowe et al. |

FOREIGN PATENT DOCUMENTS

| DE | 10 2004 063 220 | 7/2006 |
| DE | 10 2005 007 034 | 8/2006 |
| EP | 1 717 022 | 11/2006 |
| JP | 10-281389 | 10/1998 |
| JP | 2006-281217 | 10/2006 |
| KR | 2003-0081039 | 10/2003 |

OTHER PUBLICATIONS

U.S. Appl. No. 13/443,453, filed Apr. 10, 2012, Hartmann, et al.
U.S. Appl. No. 13/463,061, filed May 3, 2012, Goering, et al.
U.S. Appl. No. 13/640,552, filed Oct. 11, 2012, Kuhmann, et al.
U.S. Appl. No. 13/639,765, filed Oct. 5, 2012, Kuhmann, et al.
U.S. Appl. No. 13/640,679, filed Oct. 11, 2012, Kuhmann, et al.
U.S. Appl. No. 13/640,586, filed Oct. 11, 2012, Kuhmann, et al.
International Search Report dated May 31, 2010 in PCT/EP10/050622 filed Jan. 20, 2010.
U.S. Appl. No. 13/872,207, filed Apr. 29, 2013, Berger, et al.
U.S. Appl. No. 13/872,226, filed Apr. 29, 2013, Berger, et al.
U.S. Appl. No. 11/354,114, filed Feb. 15, 2006, Dowe, et al.
U.S. Appl. No. 11/354,100, filed Feb. 15, 2006, Dowe, et al.
U.S. Appl. No. 11/480,459, filed Jul. 5, 2006, Dowe, et al.
U.S. Appl. No. 12/374,832, filed Jan. 23, 2009, Dowe, et al.
U.S. Appl. No. 12/675,122, filed Feb. 25, 2010, Dowe, et al.
U.S. Appl. No. 13/063,134, filed Mar. 9, 2011, Dowe, et al.
U.S. Appl. No. 12/676,752, filed Mar. 5, 2010, Dowe, et al.

* cited by examiner

*Primary Examiner* — Ellen S Wood
(74) *Attorney, Agent, or Firm* — Oblon, McClelland, Maier & Neustadt, L.L.P.

(57) ABSTRACT

A metal conduit pipe, which is covered with an extruded layer made of polyamide molding compound, is used to produce a duct laid in water, wherein in the course of laying the duct, the coating is exposed to a shearing pressure load and/or a bending load due to laying method selected.

18 Claims, No Drawings

USE OF A CONDUIT PIPE FOR PRODUCING A DUCT LAID IN WATER

The present invention relates to the use of a metallic pipe which has an extruded coating layer made of a polyamide moulding composition, for producing a pipeline laid in water.

When production lines, transport lines, risers, or product lines are made of metal, they are nowadays, by way of example, coated with a polyolefin, e.g. polyethylene or polypropylene (WO 2002/094922; US 2002/0066491; EP-A-0346101). The coating serves primarily to prevent corrosion; there are corresponding standards that describe these, an example being DIN EN 10288 or DIN 30678 for polyolefin coating. When polyolefin coating is used, this layer is produced, for example, by means of an extruded-tube process or extruded-wrapping process. To promote adhesion, it is possible to apply epoxy layers and adhesive layers in succession prior to the extrusion process.

Other prior art, regulated by DIN EN 10310 (German Version of EN 10310:2003), uses polyamide powder for the coating of steel pipes for pipelines laid in the ground or in water. The polyamide coating is applied via immersion into a fluidized bed, spray-application, or the roller-application process. By virtue of the process, powder coating can only apply relatively thin layers to the metal. A particular disadvantage is that the coating requires use of a powder made of a relatively low-molecular-weight polyamide, in order to ensure good flow of the melt on the hot metal surface. However, a coating thus obtained has inadequate mechanical strength; it serves mainly to prevent corrosion. Another particular disadvantage is that this method does not permit application of a polyamide layer to a pipe which already comprises a coating made of a polyolefin or of an adhesion-promoter layer.

There are also known thermoset coatings based on epoxy or on polyurethane.

Within the field of pipeline construction, there are increasingly stringent technical requirements placed on the pipeline coating, deriving from increasingly strict conditions relating to the environment, the laying process, and factory operations. One of the most effective methods for preventing corrosion of pipelines laid in the ground, in particular when using cathodic corrosion-prevention, is multilayer jacketing. This uses an epoxy resin layer as first layer, a copolymer adhesive as second layer, and an exterior polyolefin layer made of polyethylene or polypropylene. This jacketing method is applicable over the whole range from small pipes to large pipes. However, in the offshore and onshore sector there are often additional stringent requirements relating to resistance to mechanical stresses.

In the offshore sector, large laying depths nowadays require the use of specific techniques for the laying process, an example being the J-lay method. This is a process using almost vertical assembly of the laying length on a semi-immersed laying platform or on appropriately equipped laying pontoons or laying ships. Appropriate holder devices are used to fix the end of one length of the pipe in order to assemble the following pipe section. The forces acting on the corrosion-prevention coating during this process are not inconsiderable. Specifically, these involve pressure forces exerted by the holder device in essence perpendicularly with respect to the weight of the clamped pipe. The corrosion-prevention coating is thus subject to shearing pressure load.

Another method for submarine laying of pipelines is the S-lay process. This is used in particular at relatively small laying depths. The pipeline is usually welded horizontally on a laying ship, and checked, and passed into the water by way of what is known as a stinger. The function of the stinger here is to support the line and let it out with an acceptable bending radius. The shape of the pipe here, across the laying ship, the stinger and the seabed is that of an elongate "S". The mechanical load on the corrosion-protected pipe length is somewhat smaller than that in the reeling method or the J-lay method.

The process known as reeling, e.g. as described in U.S. Pat. No. 4,117,692 or EP-A-1 104 525, winds the preassembled pipe length onto appropriately dimensioned drums. This process causes plastic deformation of the pipe length. For open-sea laying, the pipe length is in turn directed over appropriate rollers before laying. However, the corrosion-prevention coating is exposed to considerable stresses caused by flexural load, because very high forces are transmitted onto the surface of the pipe and therefore onto the coating during the winding-up and unwinding process. As the diameter of winding decreases, the forces transmitted increase. However, minimum winding diameter is desirable in order to optimize transport capacities.

The J-lay method, the S-lay method, and the reeling method are described in more detail by way of example in OCS Report MMS 2001-067, "Brief Overview of Gulf of Mexico OCS Oil and Gas Pipelines: Installation, Potential Impacts, and Mitigation Measures", published by U.S. Department of the Interior, Minerals Management Service, New Orleans, August 2001.

The conventional jacketing systems, which serve in essence to prevent corrosion, do not provide adequate protection from mechanical loads. Pressure stress or frictional stress during the winding and unwinding procedure, or by virtue of shearing load caused by grippers during the handling process, can damage portions of the polymer layer in such a way that metal comes into contact with water. The corrosion that then occurs reduces the operating time of the pipeline considerably. It is therefore necessary to make a considerable increase in the thickness of the jacketing system, and this increases pipeline costs; it is also places limits on any further reduction in winding diameter. Known coating systems based on polyethylene or on polypropylene are moreover extremely brittle, particularly at relatively low temperatures, and for this reason alone they have only limited suitability for these mechanical stresses that occur during pipeline laying.

The object of the invention is therefore to provide a coated metallic pipe which withstands the high mechanical stresses occurring during the laying process in water. A particular intention is that this pipe permits a reduction in winding diameter and retains the integrity of the coating when the winding procedure produces high mechanical stress, the result being that the metal pipe has effective protection from corrosion. A further intention is to achieve secure adhesion to the pipe or to any coatings present thereon. The overall intention is to provide a pipe which can give easy handling and which can be produced at low cost.

The use of a coated metallic pipe for producing a pipeline laid in water achieves these objects and other objects discernible from the application documents, where, in the course of the laying process, and by virtue of the selected laying process, the coating has been exposed to a shearing pressure load and/or to a flexural load, with the proviso that the pipe has an extruded coating layer made of a polyamide moulding composition.

The expression "in water" means laying on the bed of a body of water, e.g. on the seabed, or laying at any desired height between the bed of the body of water and the surface of the body of water.

"Coating" here and hereinafter means the entirety of all of the layers applied to the metal surface, i.e. not only the coating layer made of a polyamide moulding composition but also any intermediate layers present, functioning as adhesion promoters and the like.

The metallic pipe is composed by way of example of stainless or other steel, copper, aluminium, cast iron, galvanized steel, steel coated with metal alloys, such as GALFAN, or is composed of any other metal. The pipe can also be produced by any of the prior-art methods, for example in the form of a welded or seamless pipe. Corresponding production processes are well-known prior art.

The laying processes selected according to the invention are preferably the J-lay method, the S-lay method, and the reeling method.

According to the invention, it has been found that a particular major advantage of a polyamide coating for pipes for the application sector described is that polyamide retains its good mechanical properties specifically at relatively low ambient temperatures. Other advantageous properties for these applications are the excellent notched impact resistance, the exceptional abrasion performance and frictional performance, and also the good adhesion capability of polyamide.

The polyamide can be produced from a combination of diamine and dicarboxylic acid, from an ω-aminocarboxylic acid, or from the corresponding lactam. In principle, it is possible to use any polyamide, such as PA46, PA6, PA66, or copolyamides on this basis having units deriving from terephthalic acid and/or from isophthalic acid (generally termed PPA). In one preferred embodiment, the monomer units contain an average of at least 8 carbon atoms, at least 9 or at least 10. In the case of mixtures of lactams, the arithmetic average is taken. In the case of combinations of diamine and dicarboxylic acid, the arithmetic average of the carbon atoms of diamine and dicarboxylic acid in this preferred embodiment has to be at least 8, at least 9, or at least 10. Examples of suitable polyamides are: PA610 (which can be produced from hexamethylenediamine [6 carbon atoms] and sebacic acid [10 carbon atoms], the average number of carbon atoms in the monomer units therefore being 8 here), PA88 (which can be produced from octamethylenediamine and 1,8-octanedioic acid), PA8 (which can be produced from caprylolactam), PA612, PA810, PA108, PA9, PA613, PA614, PA812, PA128, PA1010, PA10, PA814, PA148, PA1012, PA11, PA1014, PA1212, and PA12. The production of the polyamides is prior art. It is, of course, also possible to use copolyamides on this basis which also, if appropriate, make concomitant uses of monomers, such as caprolactam.

The polyamide can also be a polyetheresteramide or a polyetheramide. Polyetheramides are in principle known by way of example from DE-A 30 06 961. They contain a polyetherdiamine as comonomer. Suitable polyetherdiamines are obtainable via conversion of the corresponding polyetherdiols by using reductive amination or coupling to acrylonitrile with subsequent hydrogenation (e.g. EP-A-0 434 244; EP-A-0 296 852). Their number-average molecular weight is generally from 230 to 4000; their proportion of polyetheramide is preferably from 5 to 50% by weight.

Polyetherdiamines based on propylene glycol are commercially available in the form of JEFFAMIN® D grades from Huntsman.

In principle, polyetherdiamines based on 1,4-butanediol or 1,3-butanediol also have good suitability, as do polyetherdiamines of mixed structure, for example having random or blockwise distribution of the units deriving from the diols.

It is also possible to use mixtures of various polyamides, with the proviso of adequate compatibility. Compatible polyamide combinations are known to the person skilled in the art; by way of example, the following combinations may be listed here: PA12/PA1012, PA12/PA1212, PA612/PA12, PA613/PA12, PA1014/PA12, and PA610/PA12, and also corresponding combinations with PA11. In case of doubt, compatible combinations can be found through routine experimentation.

One preferred embodiment uses a mixture made of from 30 to 99% by weight, particularly preferably from 40 to 98% by weight, and with particular preference from 50 to 96% by weight, of polyamide in the narrower sense, and also from 1 to 70% by weight, particularly preferably from 2 to 60% by weight, and with particular preference from 4 to 50% by weight, of polyetheresteramide and/or polyetheramide. Preference is given here to polyetheramides.

The moulding composition can comprise further components alongside polyamide, examples being impact modifiers, other thermoplastics, plasticizers, and other conventional additives. The only requirement is that the polyamide forms the matrix of the moulding composition.

Examples of suitable impact modifiers are ethylene/α-olefin copolymers, preferably selected from a) ethylene/$C_3$-$C_{12}$-α-olefin copolymers having from 20 to 96% by weight, preferably from 25 to 85% by weight, of ethylene. An example of $C_3$-$C_{12}$-α-olefin used is propene, 1-butene, 1-pentene, 1-hexene, 1-octene, 1-decene or 1-dodecene. Typical examples of these are ethylene-propylene rubber, and also LLDPE and VLDPE.

b) Ethylene/$C_3$-$C_{12}$-α-olefin/unconjugated diene terpolymers having from 20 to 96% by weight, preferably from 25 to 85% by weight, of ethylene and up to a maximum of about 10% by weight of an unconjugated diene, such as bicyclo[2.2.1]heptadiene, 1,4-hexa-diene, dicyclopentadiene or 5-ethylidenenorbornene. Another example of a suitable $C_3$-$C_{12}$-α-olefin is propene, 1-butene, 1-pentene, 1-hexene, 1-octene, 1-decene, or 1-dodecene.

The production of these copolymers or terpolymers is prior art, for example with the aid of a Ziegler-Natta catalyst.

Other suitable impact modifiers are styrene-ethylene/butylene block copolymers. Here, it is preferable to use styrene-ethylene/butylene-styrene block copolymers (SEBS), these being obtainable via hydrogenation of styrene-butadiene-styrene block copolymers. However, it is also possible to use diblock systems (SEB) or multiblock systems. Block copolymers of this type are prior art.

These impact modifiers preferably contain anhydride groups, which are introduced in a known manner via thermal or free-radical reaction of the main-chain polymer with an unsaturated dicarboxylic anhydride, with an unsaturated dicarboxylic acid, or with a monoalkyl ester of an unsaturated dicarboxylic acid, where the concentration of these groups is adequate for good coupling to the polyamide. An example of a suitable reagent is maleic acid, maleic anhydride, monobutyl maleate, fumaric acid, citraconic anhydride, aconitic acid, or itaconic anhydride. The amount of an unsaturated anhydride grafted onto the impact modifier by this method is preferably from 0.1 to 4% by weight. According to the prior art, the materials applied by grafting can also comprise another unsaturated monomer, such as styrene, α-methylstyrene, or indene, alongside the unsaturated dicarboxylic anhydride or its precursor.

Other suitable impact modifiers are copolymers containing units of the following monomers:
a) from 20 to 94.5% by weight of one or more α-olefins having from 2 to 12 carbon atoms,
b) from 5 to 79.5% by weight of one or more acrylic compounds, selected from
   acrylic acid or methacrylic acid or salts thereof,
   esters of acrylic acid or, respectively, methacrylic acid with a $C_1$-$C_{12}$ alcohol, which can, if appropriate, bear a free hydroxy or epoxy function,
   acrylonitrile or methacrylonitrile, acrylamides or methacrylamides,
c) from 0.5 to 50% by weight of an olefinically unsaturated epoxide, carboxylic anhydride, carboxyimide, oxazoline or oxazinone.

Said copolymer is by way of example composed of the following monomers, this being a non-exhaustive list:
a) α-olefins, such as ethylene, propene, 1-butene, 1-pentene, 1-hexene, 1-octene, 1-decene, or 1-dodecene;
b) acrylic acid, methacrylic acid, or salts thereof, for example with $Na^{\oplus}$ or $Zn^{2\oplus}$ as counter ion; methyl acrylate, ethyl acrylate, n-propyl acrylate, n-butyl acrylate, isobutyl acrylate, n-hexyl acrylate, n-octyl acrylate, 2-ethylhexyl acrylate, isononyl acrylate, dodecyl acrylate, methyl methacrylate, ethyl methacrylate, n-propyl methacrylate, n-butyl methacrylate, isobutyl methacrylate, 2-ethylhexyl methacrylate, hydroxyethyl acrylate, 4-hydroxybutyl methacrylate, glycidyl acrylate, glycidyl methacrylate, acrylonitrile, methacrylo-nitrile, acrylamide, N-methylacrylamide, N,N-dimethylacrylamide, N-ethylacrylamide, N-hydroxyethylacrylamide, N-propylacrylamide, N-butylacrylamide, N-(2-ethylhexyl)acrylamide, methacrylamide, N-methylmethacrylamide, N,N-dimethylmethacrylamide, N-ethyl-methacrylamide, N-hydroxyethylmethacrylamide, N-propylmethacrylamide, N-butylmethacrylamide, N,N-dibutylmethacrylamide, N-(2-ethylhexyl)methacrylamide;
c) vinyloxirane, allyloxirane, glycidyl acrylate, glycidyl methacrylate, maleic anhydride, aconitic anhydride, itaconic anhydride, and also the dicarboxylic acids produced from these anhydrides via reaction with water; maleimide, N-methylmaleimide, N-ethylmaleimide, N-butylmaleimide, N-phenylmaleimide, aconitimide, N-methyl-aconitimide, N-phenylaconitimide, itaconimide, N-methylitaconimide, N-phenylitaconimide, N-acryloylcaprolactam, N-methacryloyl-caprolactam, N-acryloyllaurolactam, N-methacryloyllaurolactam, vinyloxazoline, isopropenyloxazoline, allyloxazoline, vinyloxazinone, or isopropenyloxazinone.

If glycidyl acrylate or glycidyl methacrylate is used, this compound also simultaneously functions as acrylic compound b), and if the amount of glycidyl (meth)acrylate is adequate there is therefore no need for the presence of any further acrylic compound. In this specific embodiment, the copolymer contains units of the following monomers:
a) from 20 to 94.5% by weight of one or more α-olefins having from 2 to 12 carbon atoms,
b) from 0 to 79.5% by weight of one or more acrylic compounds, selected from
   acrylic acid or methacrylic acid or salts thereof,
   esters of acrylic acid or, respectively, methacrylic acid with a $C_1$-$C_{12}$ alcohol,
   acrylonitrile or methacrylonitrile,
   acrylamides or methacrylamides,
c) from 0.5 to 80% by weight of an ester of acrylic acid or methacrylic acid, where the ester contains an epoxy group, where the entirety of b) and c) is at least 5.5% by weight.

The copolymer can contain a small amount of other copolymerized monomers as long as these do not significantly impair properties, an example being dimethyl maleate, dibutyl fumarate, diethyl itaconate, or styrene.

The production of these copolymers is prior art. A wide variety of types of these is obtainable commercially, for example as LOTADER® (Arkema; ethylene/acrylate/tercomponent or ethylene/glycidyl methacrylate).

In one preferred embodiment, this polyamide moulding composition comprises the following components:
1. from 60 to 96.5 parts by weight of polyamide,
2. from 3 to 39.5 parts by weight of an impact-modifying component which contains anhydride groups, where the impact-modifying component has been selected from ethylene/α-olefin copolymers and styrene-ethylene/butylene block copolymers,
3. from 0.5 to 20 parts by weight of a copolymer which contains units of the following monomers:
   a) from 20 to 94.5% by weight of one or more α-olefins having from 2 to 12 carbon atoms,
   b) from 5 to 79.5% by weight of one or more acrylic compounds, selected from
      acrylic acid or methacrylic acid or salts thereof,
      esters of acrylic acid or, respectively, methacrylic acid with a $C_1$-$C_{12}$ alcohol, which can, if appropriate, bear a free hydroxy or epoxy function,
      acrylonitrile or methacrylonitrile,
      acrylamides or methacrylamides,
   c) from 0.5 to 50% by weight of an olefinically unsaturated epoxide, carboxylic anhydride, carboxyimide, oxazoline or oxazinone,
where the total of the parts by weight of components according to 1., 2., and 3. is 100.

In another preferred embodiment, this moulding composition comprises:
1. from 65 to 90 parts by weight and particularly preferably from 70 to 85 parts by weight of polyamide,
2. from 5 to 30 parts by weight, particularly preferably from 6 to 25 parts by weight and with particular preference from 7 to 20 parts by weight of the impact-modifying component,
3. from 0.6 to 15 parts by weight and particularly preferably from 0.7 to 10 parts by weight of the copolymer, which preferably contains units of the following monomers:
   a) from 30 to 80% by weight of α-olefin(s),
   b) from 7 to 70% by weight and particularly preferably from 10 to 60% by weight of the acrylic compound(s),
   c) from 1 to 40% by weight and particularly preferably from 5 to 30% by weight of the olefinically unsaturated epoxide, carboxylic anhydride, carboximide, oxazoline, or oxazinone.

Another impact-modifying component that can also be used is nitrile rubber (NBR) or hydrogenated nitrile rubber (HNBR), where these optionally contain functional groups. US2003/0220449A1 describes corresponding moulding compositions.

Other thermoplastics which can be present in the polyamide moulding composition are primarily polyolefins. In one embodiment, as described at an earlier stage above in relation to the impact modifiers, they can contain anhydride groups, and are then optionally present together with an unfunctionalized impact modifier. In another embodiment, these are unfunctionalized and are present in the moulding composition in combination with a functionalized impact modifier or with a functionalized polyolefin. The term "functionalized" means that the polymers have been provided according to the prior art with groups that can react with the end groups of the polyamide, examples being anhydride groups, carboxy groups, epoxy groups, or oxazoline groups. Preference is given here to the following constitutions:
1. from 50 to 95 parts by weight of polyamide,
2. from 1 to 49 parts by weight of functionalized or unfunctionalized polyolefin, and also
3. from 1 to 49 parts by weight of functionalized or unfunctionalized impact modifier,
where the total of the parts by weight of components according to 1., 2., and 3. is 100.

The polyolefin is by way of example polyethylene or polypropylene. In principle, it is possible to use any commercially available grade. Examples of those that can be used are therefore: high-, medium-, or low-density linear polyethylene, LDPE, ethylene-acrylate copolymers, ethylene-vinyl acetate copolymers, isotactic or atactic homopolypropylene, random copolymers of propene with ethene and/or 1-butene, ethylene-propylene block copolymers, etc. The polyolefin can be produced by any known process, for example by the Ziegler-Natta or the Phillips process, or by means of metallocenes, or by a free-radical route. In this case the polyamide can also be, for example, PA6 and/or PA66.

In one possible embodiment, the moulding composition comprises from 1 to 25% by weight of plasticizer, particularly preferably from 2 to 20% by weight, and with particular preference from 3 to 15% by weight.

Plasticizers and their use with polyamides are known. A general overview of plasticizer suitable for polyamides can be found in Gächter/Müller, Kunststoffadditive [Plastics Additives], C. Hanser Verlag, 2nd Edition, p. 296.

Examples of conventional compounds suitable as plasticizers are esters of p-hydroxybenzoic acid having from 2 to 20 carbon atoms in the alcohol component, or amides of arylsulphonic acids having from 2 to 12 carbon atoms in the amine component, preferably amides of benzenesulphonic acid. Plasticizers that can be used are inter alia ethyl p-hydroxybenzoate, octyl p-hydroxybenzoate, isohexadecyl p-hydroxybenzoate, N-n-octyl-toluenesulphonamide, N-n-butylbenzenesulphonamide, or N-2-ethylhexyl-benzenesulphonamide.

The moulding composition can moreover also comprise conventional amounts of additives necessary for adjustment of certain properties. Examples of these are pigments and fillers, such as carbon black, titanium dioxide, zinc sulphide, silicates, or carbonates, reinforcing fibres, e.g. glass fibres, processing aids, such as waxes, zinc stearate, or calcium stearate, flame retardants, such as magnesium hydroxide, aluminium hydroxide, or melamine cyanurate, antioxidants, UV stabilizers, and also additions which give the product antielectrostatic properties or electrical conductivity, e.g. carbon fibres, graphite fibrils, stainless-steel fibres, or conductive carbon black.

Good mechanical robustness of the coating polyamide is obtained particularly if the viscosity of the polyamide moulding composition applied is at least 2000 Pa·s, at 240° C. at a shear rate of 0.1 sec$^{-1}$, preferably at least 2300 Pa·s, particularly preferably at least 3000 Pa·s, with particular preference at least 5000 Pa·s, and with very particular preference at least 8000 Pa·s. Viscosity is determined to ASTM D 4440-3 in a cone-and-plate viscometer.

High viscosity of the polyamide moulding composition is generally attended by high molecular weight of the polyamide. A measure of the molecular weight of the polyamide is its solution viscosity. For the purposes of the invention it is preferable that the relative solution viscosity $\eta_{rel}$ of the polyamide in the moulding composition applied, measured in 0.5% strength by weight solution in m-cresol at 23° C. to ISO 307, is at least 1.8, particularly preferably at least 2.0, with particular preference at least 2.1, and very particularly preferably at least 2.2.

A known process for the production of polyamides of this type is solid-phase post-condensation of pelletized low-viscosity polyamides to give high-viscosity polyamide at a temperature lower than the melting point. The process is described by way of example in CH 359 286, and also U.S. Pat. No. 3,821,171. The solid-phase post-condensation of polyamides is normally carried out under inert gas or reduced pressure in a dryer operating batchwise or continuously. This method permits production of polyamides with very high molecular weight.

Another method of producing high-viscosity polyamides is continuous post-condensation in the melt, using various types of screw apparatuses.

WO 2006/079890 states that high-viscosity polyamide moulding compositions can be obtained via mixing of a high-molecular-weight polyamide and of a low-molecular-weight polyamide.

Another possible route to high-viscosity polyamides and polyamide moulding compositions uses additives that increase molecular weight; suitable additives or processes are described by way of example in the following specifications: WO 98/47940, WO 96/34909, WO 01/66633, WO 03/066704, JP-A-01/197526, JP-A-01/236238, DE-B-24 58 733, EP-A-1 329 481, EP-A-1 518 901, EP-A-1 512 710, EP-A-1 690 889, EP-A-1 690 890, and WO 00/66650.

However, the moulding compositions produced according to this prior art generally require very high current consumption or very high torque in the extrusion process, with high pressure at the die. Furthermore, the high shear forces result in appreciable chain cleavage, thus reducing molecular weight during processing.

For the purposes of the invention, it is therefore preferable that the condensation process to increase the molecular weight of the polyamide moulding composition, with the aid of an additive that increases molecular weight, is delayed until the processing procedure has begun. The invention therefore also provides the use according to the claims of a pipe where the extruded layer made of a polyamide moulding composition has been applied by means of the following process steps:
a) provision of a polyamide moulding composition,
b) production of a premix of the polyamide moulding composition and of the additive that increases molecular weight, for example a compound having at least two carbonate units,
c) if appropriate, storage and/or transport of the mixture, and
d) then use of the mixture for the extrusion process, where the condensation process to increase molecular weight is delayed until this step has begun.

It has been found that, given this mode of addition during processing, a significant increase in melt stiffness occurs, while the load on the motor is simultaneously low. It is therefore possible, despite high melt viscosity, to achieve high processing throughputs, the result of this being an improvement in the cost-effectiveness of the production process. The process is described by way of example below for the case where the additive that increases molecular weight is a compound having at least two carbonate units.

The molecular weight Mn of the starting polyamide is preferably greater than 5000, in particular greater than 8000. Polyamides used here are those whose end groups at least to some extent take the form of amino groups. By way of example, at least 30%, at least 40%, at least 50%, at least 60%, at least 70%, at least 80% or at least 90%, of the end groups take the form of amino end groups. The production of polyamides having relatively high amino end group content, using diamines or polyamines as a regulator, is prior art. In the present instance, the production of the polyamide preferably uses an aliphatic, cycloaliphatic or araliphatic diamine having from 4 to 44 carbon atoms, as regulator. Examples of suitable diamines are hexamethylenediamine, decamethylenediamine, 2,2,4- or 2,4,4-trimethyl-hexamethylenediamine, dodecamethylenediamine, 1,4-diaminocyclohexane, 1,4- or 1,3-dimethylaminocyclohexane, 4,4'-diaminodicyclo-hexylmethane, 4,4'-diamino-3,3'-dimethyldicyclohexylmethane, 4,4'-diaminodicyclohexylpropane, isophoronediamine, metaxylylenediamine or paraxylylenediamine.

In another preferred embodiment, a polyamine is used as regulator and simultaneously as branching agent, during the production of the polyamide. Examples here are diethylenetriamine, 1,5-diamino-3-(β-amino-ethyl)pentane, tris(2-aminoethyl)amine, N,N-bis(2-aminoethyl)-N',N'-bis[2-[bis (2-aminoethyl)amino]ethyl]-1,2-ethanediamine, dendrimers, and polyethyleneimines, in particular branched polyethyleneimines, which are obtainable via polymerization of aziridines (Houben-Weyl, Methoden der Organischen Chemie [Methods of organic chemistry], Volume E20, pages 1482-1487, Georg Thieme Verlag Stuttgart, 1987), and which generally have the following amino group distribution:

from 25 to 46% of primary amino groups,
from 30 to 45% of secondary amino groups and
from 16 to 40% of tertiary amino groups.

The compound having at least two carbonate units is used in a quantitative proportion of from 0.005 to 10% by weight, calculated as a ratio to the polyamide used. The said ratio is preferably in the range from 0.01 to 5.0% by weight, particularly preferably in the range from 0.05 to 3% by weight. The expression "carbonate" here means esters of carbolic acid in particular with phenols or with alcohols.

The compound having at least two carbonate units can be of low molecular weight, or oligomeric or polymeric. It can be composed entirely of carbonate units, or it can also have other units. These are preferably oligo- or polyamide units, oligo- or polyester units, oligo- or polyether units, oligo- or polyetheresteramide units or oligo- or polyetheramide units. These compounds can be produced via known oligo- or polymerization processes or by polymer-analogous reactions.

In one preferred embodiment, the compound having at least two carbonate units is a polycarbonate, for example one based on bisphenol A, or is a block copolymer which contains a polycarbonate block of this type.

When the compound used as additive and having at least two carbonate units is metered in the form of a masterbatch, this permits more precise metering of the additive, since the amounts used are larger. It has moreover been found that the use of a masterbatch achieves improved extrudate quality. The masterbatch preferably encompasses, as matrix material, the polyamide whose molecular weight has also been increased by the condensation process according to the invention, or a polyamide compatible therewith, but under the reaction conditions it is also possible for partial linkage to occur between incompatible polyamides and the polyamide whose molecular weight is to be increased by a condensation process, and this results in compatibilization. The molecular weight Mn of the polyamide used as matrix material in the masterbatch is preferably greater than 5000 and in particular greater than 8000. Preference is given here to those polyamides whose end groups mainly take the form of carboxylic acid groups. By way of example, at least 80%, at least 90% or at least 95% of the end groups take the form of acid groups. As an alternative to this, it is possible to use polyetheramides having end groups which are predominantly amino groups; this method achieves improved hydrolysis resistance.

The concentration of the compound having at least two carbonate units in the masterbatch is preferably from 0.15 to 50% by weight, particularly preferably from 0.2 to 25% by weight and with particular preference from 0.3 to 15% by weight. This type of masterbatch is produced in the usual manner known to the person skilled in the art.

Suitable compounds having at least two carbonate units, and suitable masterbatches, are described in detail in WO 00/66650, expressly included herein by way of reference.

The invention can be used with polyamides which, as a result of the production process, comprise at least 5 ppm of phosphorus in the form of an acidic compound. In this instance, from 0.001 to 10% by weight, based on the polyamide, of a salt of a weak acid is added to the polyamide moulding composition prior to the compounding process or during the compounding process. DE-A 103 37 707 discloses suitable salts, and is hereby expressly incorporated herein by way of reference.

However, the invention has equally good applicability to polyamides which, as a result of the production process, comprise less than 5 ppm of phosphorus or no phosphorus in the form of an acidic compound. Although a corresponding salt of a weak acid can be added in this instance, it is not necessary to do so.

The compound having at least two carbonate units is added as it stands or in the form of a masterbatch, not until after the compounding process, i.e. not until after the production of the polyamide moulding composition, but at the latest during processing. It is preferable that, during processing, the polyamide whose molecular weight is to be increased by a condensation process, or the polyamide moulding composition whose molecular weight is to be increased by a condensation process, is mixed in the form of pellets with the pellets or powder of the compound having at least two carbonate units, or with the corresponding masterbatch. However, it is also possible that a mixture of pellets of the finished compounded polyamide moulding composition with the compound having at least two carbonate units or with the masterbatch is produced, and then transported or stored and then processed. It is naturally also possible to use powder mixtures in corresponding operations. The decisive factor is that the mixture is not melted until processing has begun. Thorough mixing of the melt during processing is to be recommended. However, it is also equally possible that the masterbatch in the form of melt stream is added by metering with the aid of an ancillary extruder to the melt of the polyamide moulding composition to be processed, and then incorporated by thorough mixing; in that case, process steps b) and d) are combined.

In place of the compound having at least two carbonate units it is also possible to use any other suitable additive that increases molecular weight, for example an additive disclosed in the abovementioned literature. Here again, suitable quantitative proportions are from 0.005 to 10% by weight, calculated as a ratio to the polyamide used, preferably from 0.01 to 5.0% by weight, particularly preferably from 0.05 to 3% by weight.

The thickness of the polyamide layer applied has to be at least sufficient to permit production of a coherent layer under the conditions of the application process. It is preferable that the layer thickness is at least 1.0 mm, particularly at least 1.2 mm, and in particular at least 1.4 mm.

Layer thicknesses up to about 6 mm have usually proven successful, preferably up to about 5 mm, particularly preferably up to about 4 mm and with particular preference up to about 3 mm. However, it is also possible to select a thicker layer, if necessary.

The polyamide layer can have been directly applied to the metal surface. However, there is generally at least one further layer located between the metal surface and the polyamide layer. This can be one of the following layers:
- a ceramic layer, for example according to WO 03/093374;
- a primer layer, for example made of epoxy resin (U.S. Pat. No. 5,580,659) or of a water-based mixture of epoxy resin and polyacrylate latex (WO 00/04106);
- a layer made of a polyolefin which bears functional groups. Examples of functional groups that can be used are carboxy groups or anhydride groups (WO 02/094922), epoxy groups, or alkoxysilane groups (EP-A-0 346 101). The polyolefin layer can also be a foamed layer. The polyolefin is preferably polyethylene or polypropylene;
- a differently constituted adhesion promoter, intended to ensure that the bond between polyamide layer and substrate material is not impaired when subjected to mechanical stress;
- textile reinforcement in the form of woven or mats, for example made of glass fibres or aramid fibres (Kevlar).

Preferred layer arrangements are as follows:
metal/ceramic layer/polyamide layer;
metal/ceramic layer/primer layer/polyamide layer;
metal/ceramic layer/primer layer/adhesion promoter/polyamide layer;
metal/primer layer/polyamide layer;
metal/primer layer/adhesion promoter/polyamide layer;
metal/primer layer/polyolefin layer/polyamide layer.

In each of these instances, there can be at least one further layer adjacent externally to the polyamide layer, an example being a jacketing system for thermal insulation.

If a ceramic layer, primer layer, and/or polyolefin layer is present, it is applied to the pipe by any known process. Suitable processes are prior art.

The polyamide layer is applied by the method that is also prior art for the polyolefin layer, an example being an extruded-tube process or extruded-wrapping process. In one possible variant, the production and application of the polyamide layer and of a polyolefin layer or, respectively, adhesion-promoter layer which is likewise to be applied can take place together via coextrusion of a multilayer composite.

The extruded-tube process and the extruded-wrapping process are processes with a long history of success for the coating of pipes. These processes are described in more detail in Stahlrohr-Handbuch [Steel Pipe Handbook], 12th Edition, pp. 392-409, Vulkan-Verlag Essen, 1995.

The external diameter of the metal pipe is preferably at least 25 mm and at most 1000 mm, and particularly preferably at least 32 mm and at most 820 or 650 mm.

The individual sections of the pipe are connected in the specified manner to give a pipeline. In the case of the reeling method, this takes place on land. Once the sections have been connected to give the pipeline, this is then wound onto a reel and transported by ship to the construction site and, if appropriate, directly installed. However, the J-lay method or the S-lay method can also be used for the production and laying of the pipeline.

The pipeline in question can be a production line, a riser, a product line, a distribution line, a conveying line, or a transport line. It serves by way of example to transport gas, air, oils, for example crude oil, light oil or heavy oil, fuels, such as kerosene or diesel, petrochemicals, sols, liquors, or abrasive fluids.

By virtue of high mechanical strength, good abrasion properties, very high scratch resistance, and also the ideal thickness of the polyamide layer applied, it is possible according to the invention to ensure simultaneously that good corrosion prevention is provided and also that the external coating has the robustness needed for the selected laying method.

The invention also provides pipelines laid in water, where the pipeline encompasses a metallic pipe coated with an extruded layer made of a polyamide moulding composition, and where, during the course of the laying process, and by virtue of the selected laying process, the coating was subjected to a shearing pressure load and/or to a flexural load, and also a method for conveying a fluid, in which the fluid is passed through a corresponding pipeline laid in water. The fluid can by way of example be one of the abovementioned fluids.

A feature of the pipeline of the invention, in comparison with the pipelines produced according to the prior art, is markedly prolonged lifetime.

The invention claimed is:

1. A method of laying a pipeline, the method comprising:
   laying a coated metallic pipe comprising an extruded coating layer such that the extruded coating layer is subjected to a shearing pressure load and a flexural load,
   wherein the extruded coating layer comprises a polyamide molding composition,
   the coated metallic pipe has been wound up for transport and is unwound prior to, or during, the laying of the coated metallic pipe, or the coated metallic pipe is laid by a J-lay method or by a S-lay method,
   a viscosity of the polyamide molding composition according to ASTM D 4440-3 is at least 2000 Pa·s at 240° C. using a shear rate of 0.1 sec$^{-1}$,
   the coated metallic pipe further comprises at least one further layer between a metallic pipe of the coated metallic pipe and the extruded coating layer, and
   the at least one further layer is at least one layer selected from the group consisting of:
   a ceramic layer; a primer layer; a layer made of a polyolefin bearing at least one functional group; an adhesion-promoter layer; and a textile reinforcement in the form of woven or mats.

2. The method of claim 1, wherein an external diameter of the coated metallic pipe is from 25 to 1000 mm.

3. The method of claim 1, wherein a relative solution viscosity $\eta_{rel}$ of the polyamide molding composition in the extruded coating layer is at least 1.8 to ISO 307.

4. The method of claim 1, wherein the extruded coating layer is applied by
   a) mixing the polyamide moulding composition with an additive that increases molecular weight to form a premix; then
   b) extruding the coating layer with the premix.

5. The method of claim 4, wherein the additive a compound with at least two carbonate units.

6. The method of claim 1, wherein the extruding coating layer has a thickness of at least 1.0 mm.

7. A method of laying a pipeline, the method comprising:
laying a coated metallic pipe comprising an extruded coating layer such that the extruded coating layer is subjected to a shearing pressure load or a flexural load, wherein the extruded coating layer comprises a polyamide molding composition,
the coated metallic pipe further comprises at least one further layer between a metallic pipe of the coated metallic pipe and the extruded coating layer, and
the at least one further layer is at least one layer selected from the group consisting of: a ceramic layer; a primer layer; a layer made of a polyolefin bearing at least one functional group; an adhesion-promoter layer; and a textile reinforcement in the form of woven or mats.

8. The method of claim 1, wherein the viscosity of the polyamide molding composition according to ASTM D 4440-3 is at least 2300 Pa·s at 240° C. using a shear rate of 0.1 sec$^{-1}$.

9. The method of claim 1, wherein the viscosity of the polyamide molding composition according to ASTM D 4440-3 is at least 3000 Pa·s at 240° C. using a shear rate of 0.1 sec$^{-1}$.

10. The method of claim 1, wherein the viscosity of the polyamide molding composition according to ASTM D 4440-3 is at least 5000 Pa·s at 240° C. using a shear rate of 0.1 sec$^{-1}$.

11. The method of claim 1, wherein the viscosity of the polyamide molding composition according to ASTM D 4440-3 is at least 8000 Pa·s at 240° C. using a shear rate of 0.1 sec$^{-1}$.

12. The method of claim 1, wherein the coated metallic pipe has been wound up for transport and is unwound prior to, or during, the laying of the coated metallic pipe.

13. The method of claim 1, wherein the coated metallic pipe is laid by a J-lay method.

14. The method of claim 1, wherein the coated metallic pipe is laid by a S-lay method.

15. The method of claim 1, wherein the at least one further layer is at least one layer selected from the group consisting of a ceramic layer and a textile reinforcement in the form of woven or mats.

16. The method of claim 7, wherein the at least one further layer is at least one layer selected from the group consisting of: a ceramic layer; a primer layer; a layer made of a polyolefin bearing at least one functional group; and an adhesion-promoter layer.

17. The method of claim 1, wherein the at least one further layer is a ceramic layer.

18. The method of claim 1, wherein a layer arrangement of the coated metal pipe is selected from the group consisting of:
metal/ceramic layer/polyamide layer;
metal/ceramic layer/primer layer/polyamide layer;
metal/ceramic layer/primer layer/adhesion promoter/polyamide layer;
metal/primer layer/polyamide layer;
metal/primer layer/adhesion promoter/polyamide layer; and
metal/primer layer/polyolefin layer/polyamide layer.

* * * * *